United States Patent
Chen

(10) Patent No.: US 9,827,810 B2
(45) Date of Patent: Nov. 28, 2017

(54) CONNECTION STABILIZING MECHANISM BETWEEN SOLID TIRE AND BICYCLE RIM

(71) Applicant: OTRAJET INC., Taichung (TW)

(72) Inventor: Ching-Hao Chen, Taichung (TW)

(73) Assignee: OTRAJET INC., Taichung (TW)

( * ) Notice: Subject to any disclaimer, the term of this patent is extended or adjusted under 35 U.S.C. 154(b) by 0 days.

(21) Appl. No.: 15/623,368

(22) Filed: Jun. 14, 2017

(65) Prior Publication Data

US 2017/0282649 A1 Oct. 5, 2017

Related U.S. Application Data

(63) Continuation-in-part of application No. 14/596,467, filed on Jan. 14, 2015, now Pat. No. 9,776,454.

(51) Int. Cl.
*B60C 7/24* (2006.01)
*B60B 21/02* (2006.01)

(52) U.S. Cl.
CPC ............. *B60C 7/24* (2013.01); *B60B 21/021* (2013.01); *B60B 21/025* (2013.01)

(58) Field of Classification Search
CPC . B60C 7/00; B60C 7/24; F16B 21/084; F16B 21/084; F16B 21/086
USPC ....... 152/246, 311, 378, 379.3, 379.4, 379.5, 152/382, 386, 387, 388, 393
See application file for complete search history.

(56) References Cited

U.S. PATENT DOCUMENTS

| 5,040,752 A | 8/1991 | Morrison | |
| 7,159,632 B2 * | 1/2007 | Fukui | B60C 7/26 |
| | | | 152/246 |
| 8,770,243 B2 * | 7/2014 | Lee | B60C 7/105 |
| | | | 152/379.3 |
| 2006/0096685 A1 * | 5/2006 | Fukui | B60C 7/26 |
| | | | 152/387 |
| 2007/0134073 A1 | 6/2007 | Shereyk et al. | |
| 2007/0147975 A1 | 6/2007 | Homner | |
| 2012/0111468 A1 | 5/2012 | Lee | |
| 2014/0041164 A1 * | 2/2014 | Huelke | B60R 13/0206 |
| | | | 24/458 |

FOREIGN PATENT DOCUMENTS

| CN | 102026831 A | 4/2011 |
| EP | 2360381 | 8/2011 |
| EP | 2457747 A1 | 5/2012 |
| JP | 1966-008248 | 4/1966 |

(Continued)

*Primary Examiner* — S. Joseph Morano
*Assistant Examiner* — Jean Charleston
(74) *Attorney, Agent, or Firm* — Guice Patents PLLC

(57) ABSTRACT

A connection stabilizing mechanism between a solid tire and a bicycle rim. The connection stabilizing mechanism includes multiple fastening members connecting a solid tire with a bicycle rim. Each of the fastening members has a plate-shaped base section engaged with the bicycle rim and an extension section inserted into the solid tire. A free end of the extension section is inserted into the solid tire. A ratio of an extension length of the extension sect ion to a tire height of the solid tire is between 1:1.5 and 1:2.6, thereby maintaining a relative position of the center of a main body of the solid tire relative to the rim. Thus, the solid tire is prevented from being detached from the rim due to excessive lateral movement of the central position of the main body of the solid tire.

13 Claims, 4 Drawing Sheets

(56) References Cited

FOREIGN PATENT DOCUMENTS

| | | |
|---|---|---|
| JP | 1969-004013 | 2/1969 |
| JP | 1979-045875 | 2/1979 |
| JP | 2006143187 | 6/2006 |
| JP | P2011-527974 A | 11/2011 |
| TW | 498862 | 8/2002 |
| TW | 200918356 | 5/2009 |
| WO | 2004000585 | 12/2003 |
| WO | 2011010785 A1 | 1/2011 |

* cited by examiner

CONNECTION STABILIZING MECHANISM BETWEEN SOLID TIRE AND BICYCLE RIM

This application is a Continuation-in-Part Ser. No. 14/596,467, entitled CONNECTION STRUCTURE BETWEEN AIRLESS TIRE AND RIM AND FASTENING MEMBER THEREOF, filed on Jan. 14, 2015.

BACKGROUND OF THE INVENTION

1. Field of the Invention

The present invent ion relates generally to a bicycle, and more particularly to a connection stabilizing mechanism between a solid tire and a bicycle rim.

2. Description of the Related Art

The fastening members provided in U.S. Ser. No. 14/596,467 entitled "connection structure between airless tire and rim and fastening members thereof" by the present inventor serve as connection members for connecting an airless tire with a rim. Through mutual engagement of the airless tire and the rim, the fastening members serve to provide suitable locating and support effect for the airless tire. When the airless tire is deformed, connection of the airless tire with the rim is still maintained, thereby preventing the airless tire from being detached from the rim.

SUMMARY OF THE INVENTION

The present invention provides modification on the basis of the technique of U.S. Ser. No. 14/596,467 as described above, in order to improve the stability of connection between a solid tire and a rim.

To achieve the above and other objects, the connection stabilizing mechanism between a solid tire and a bicycle rim of the present invention includes multiple fastening members connecting a solid tire with a bicycle rim. Each of the fastening members has a plate-shaped base section engaged with the bicycle rim and an extension section inserted into the solid tire. A free end of the extension section is inserted into the solid tire. A ratio of an extension length of the extension section to a tire height of the solid tire is between 1:1.5 and 1:2.6, thereby maintaining a relative position of the center of a main body of the solid tire relative to the rim. Thus, the solid tire is prevented from being detached from the rim due to excessive lateral movement of the central position of the main body of the solid tire.

More specifically, the bicycle rim has an annular rim body, an annular groove formed on an outer circumference of the rim body, two annular flanges protruding from two opposite sides of an opening of the annular groove respectively. The solid tire has an annular main body annularly disposed around the outer circumference of the rim body, an annular tire lip protruding from an inner circumference of the main body and inserted into the annular groove. Each of the fastening members has a plate-shaped base section located in the annular groove with both ends of a long axis thereof engaged with the flanges, an extension section extending outwards from the central position of the base section in the long axis direction and inserted into the main body.

Further, the extension section of the fastening member is column-shaped, and a ratio of the column diameter to the extension length is between 1:2 and 1:4, and/or a ratio of the column diameter to a tire width of the solid tire is between 1:4.5 and 1:9.

Preferably, a ratio of the extension length of the extension section to the tire height of the solid tire may be 1:1.5, 1:1.9, 1:2, 1:2.3, or 1:2.6.

Preferably, a ratio of the diameter to the extension length of the column-shaped extension section may be 1:2, 1:3 or 1:4.

Preferably, a ratio of the diameter of the column-shaped extension section to the tire width of the solid tire may be 1:4.5, 1:5, 1:5.5, 1:6, 1:8, or 1:9.

DETAILED DESCRIPTION OF THE PREFERRED EMBODIMENTS

Figure 1:
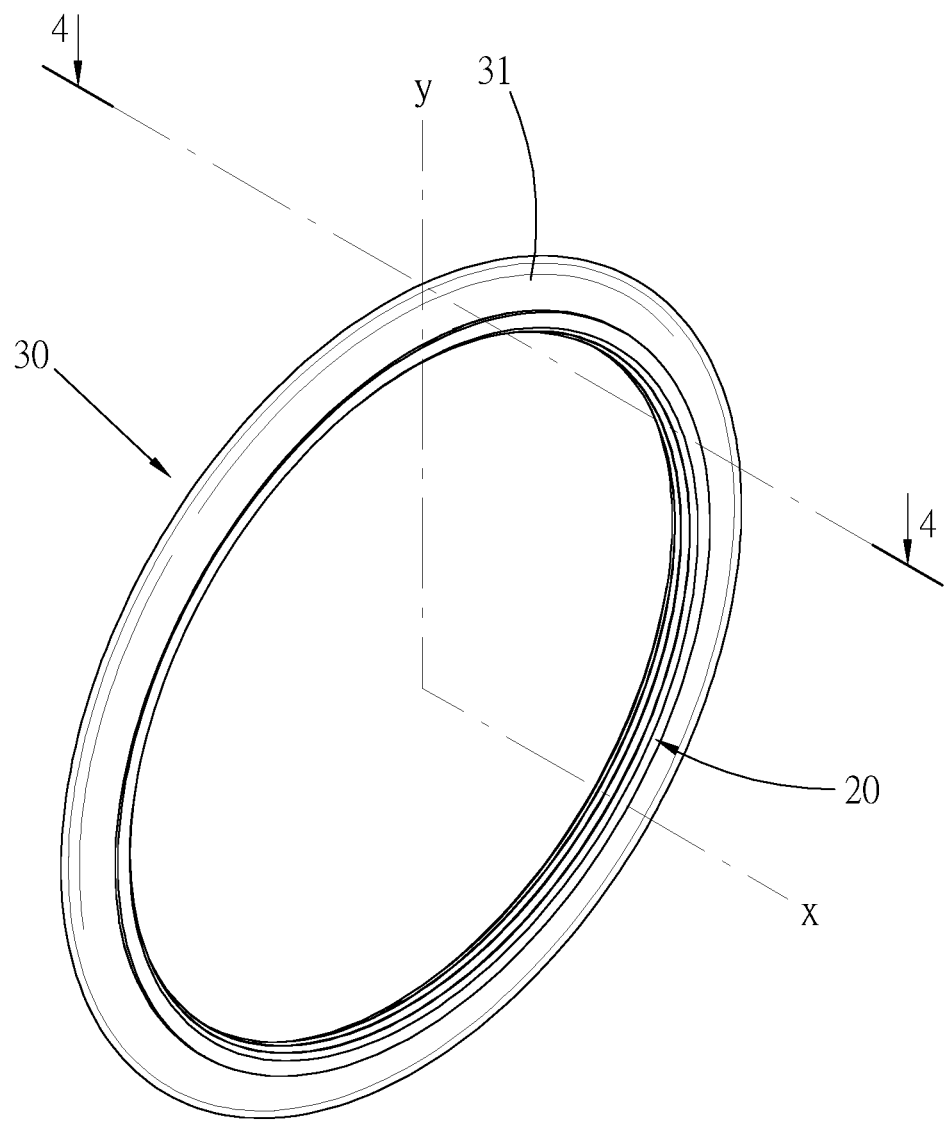
FIG. 1 is a perspective view of one embodiment of the present invention.
Figure 2:
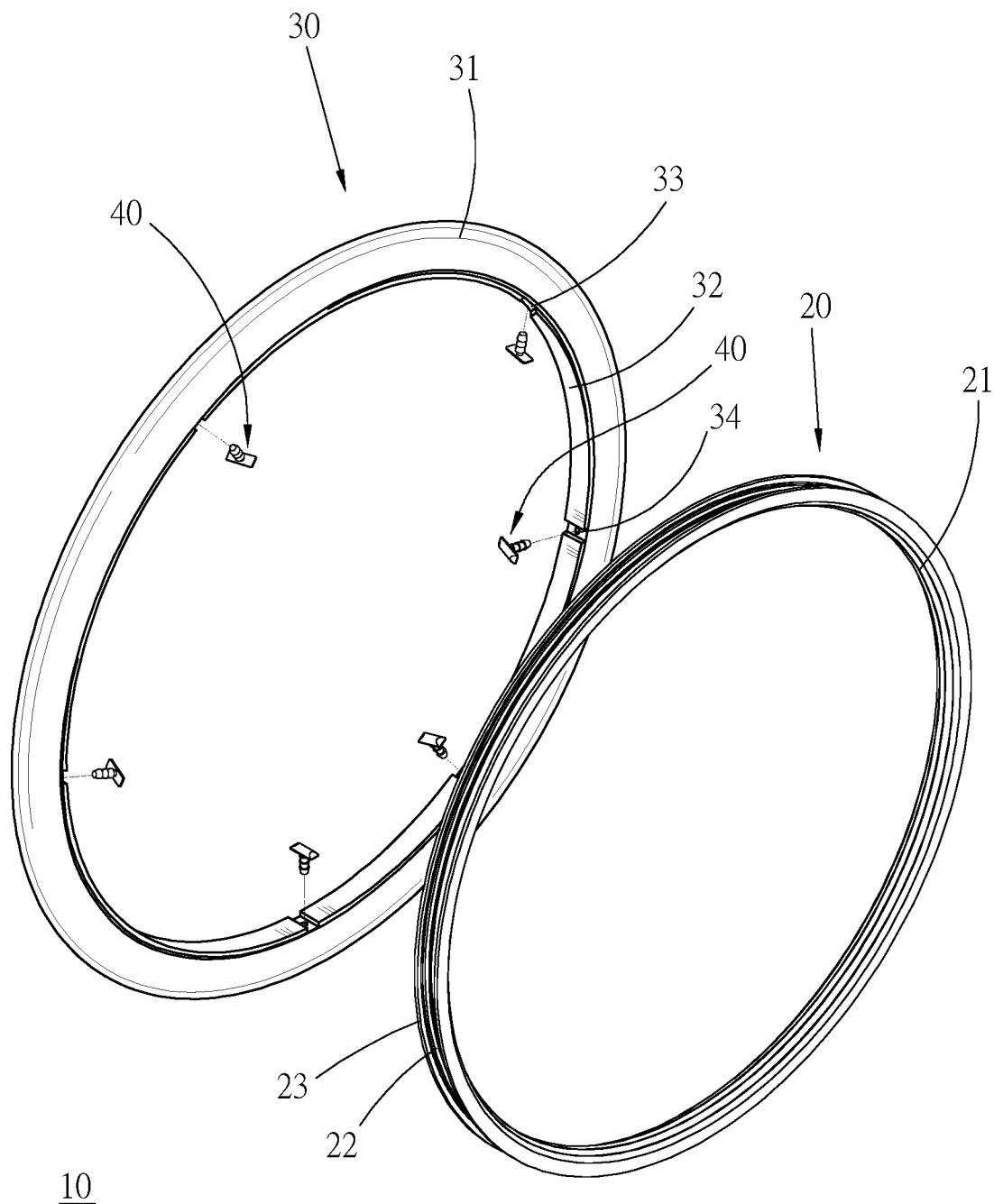
FIG. 2 is an exploded view of the embodiment of the present invention.
Figure 3:
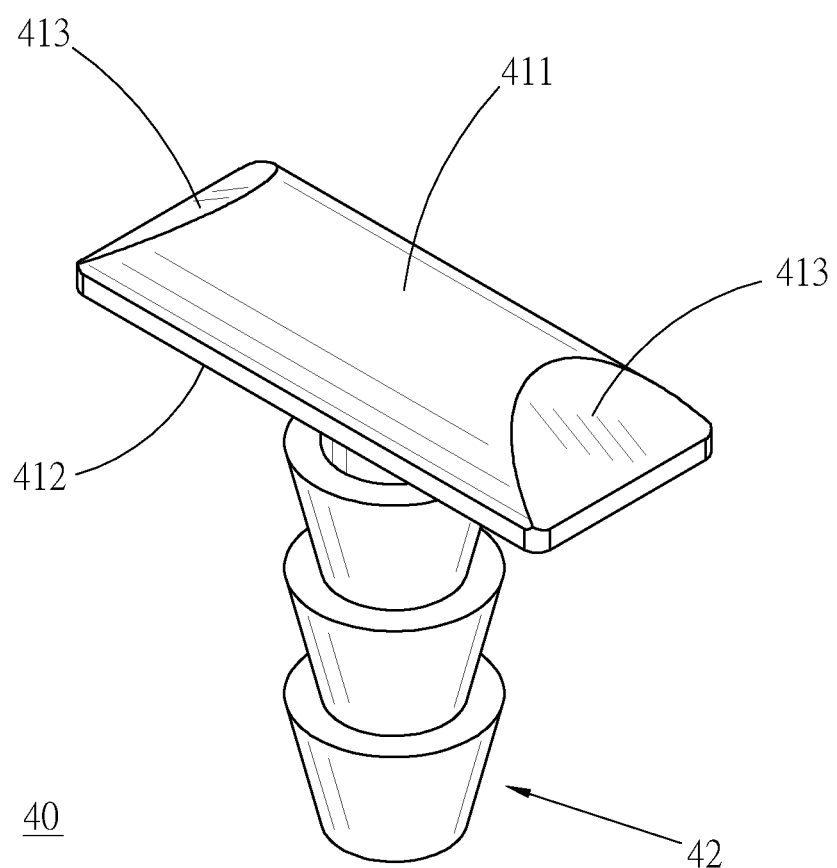
FIG. 3 is a perspective view of a fastening member of the embodiment of the present invention.
Figure 4:
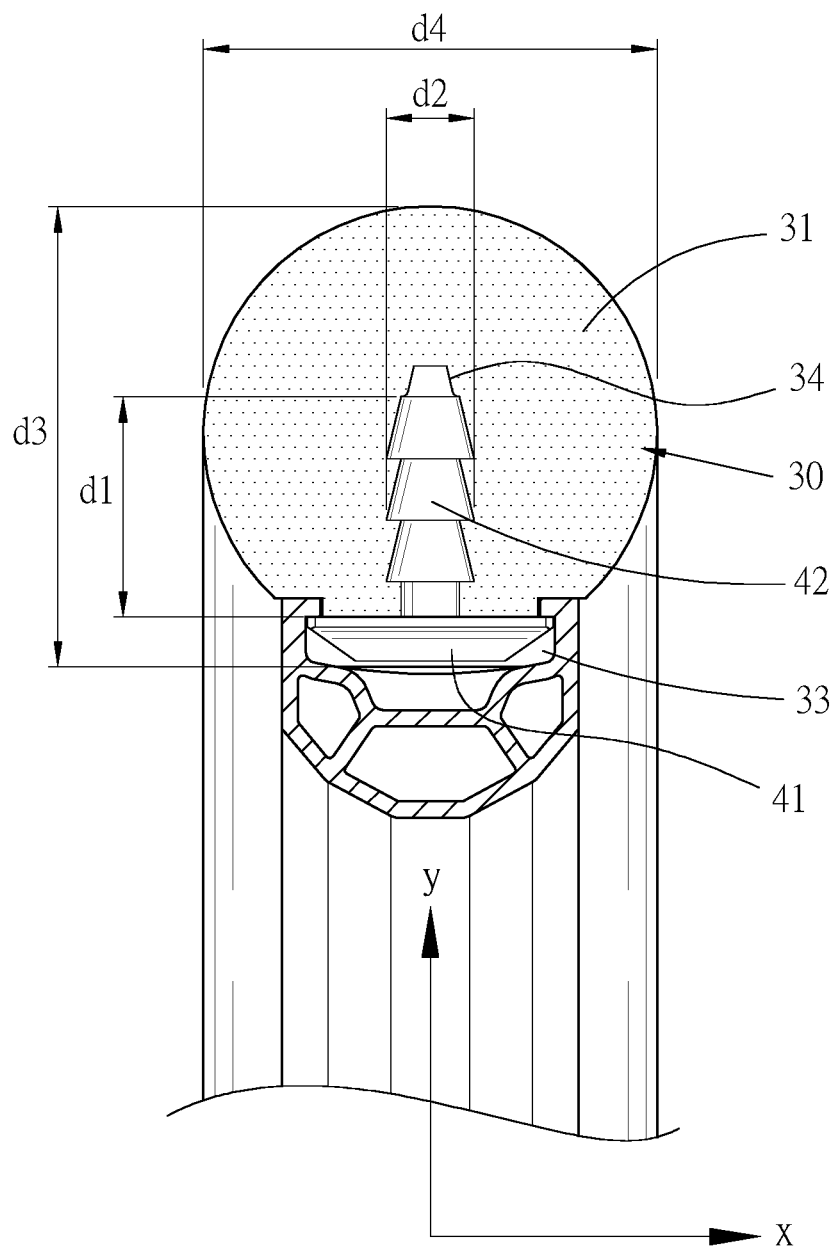
FIG. 4 is a schematic sectional view taken along line 4-4 of FIG. 1.

Please refer to FIGS. 1 to 3. According to one embodiment, a connection stabilizing mechanism (10) between solid tire and bicycle rim of the present invention includes a bicycle rim (20), a solid tire (30) and multiple fastening members (40).

The bicycle rim (20) is the conventional bicycle rim, having an annular rim body (21). An annular groove (22) is formed on an outer circumference of the rim body (21) and recessed in the rim body (21) along a radiation direction. Two symmetrical annular flanges (23) protrude from the rim body (21) corresponding to two opposite sides of an opening of the annular groove (22), respectively, to reduce an inner diameter of the opening of the annular groove (22).

The solid tire (30) is made of a polymer material with suitable elasticity by molding, and has an annular main body (31). The annular main body (31) is annularly disposed around the outer circumference of the rim body (21) and thus is closely fitted on the rim body (21). An annular tire lip (32) protrudes integrally from an inner circumference of the main body (31), is inserted into the annular groove (22), and is limited by the flanges (23). Multiple recesses (33) are disposed on the tire lip (32) at equal intervals, and extend along an axial direction (x) with respect to the center of curvature of the annular main body (31). Multiple sockets (34) are provided at central positions of the recesses (33), respectively, and extend in the main body (31) along a radial direction (y) of the main body (31).

Each of the fastening members (40) has a plate-shaped base section (41). The base section (41) is inlaid in the corresponding recess (33) and located in the annular groove (22), and is engaged with the flanges (23) by abutting both ends of a long axis thereof against inner sides of the flanges (23) respectively. A column-shaped extension section (42) extends outwards from the central position of the base section (41) in the long axis direction and is inserted into the corresponding socket (34). In this way, while the base sections (41) of the fastening members (40) are engaged with the bicycle rim (20), the fastening members (40) are connected with the solid tire (30) through the base sections (41) and the extension sections (42). The present embodiment further specifies the spacial position, extension length (d1) and column diameter (d2) of the extension section (42). More specifically, there are specific ratios between the extension length (d1) and a tire height (d3) of the solid tire (20), between the diameter (d2) and the extension length (d1) and between the diameter (d2) and a tire width (d4) of the solid tire (20).

Firstly, the extension section (42) protrudes from the central position of the base section (41) in the long axis direction, and distances of the extension section (42) from both ends of the long axis of the base section (41) are equal, to ensure that the extension sections (42) are located on the central position of the main body (31) in the axial direction (x).

A ratio (d2:d1) of the diameter (d2) to the extension length (d1) is between 1:2 and 1:4. More specifically, when the diameter (d2) is 6 mm, the extension length (d1) may be 15 mm or 19 mm or other lengths as shown in the table below, while when the diameter (d2) is 4 mm, the extension length (d1) maybe 13 mm or other lengths as shown in the table below.

| d2 | 6 mm | 6 mm | 4 mm |
|---|---|---|---|
| d1 | 19 mm | 15 mm | 13 mm |
| d2:d1 | 1:3-1:4 | 1:2-1:3 | 1:3-1:4 |
| d2:d4 | 1:5.5-1:9 | 1:4.5-1:6 | 1:5-1:8 |
| d1:d3 | 1:1.9-1:2.3 | 1:2-1:2.6 | 1:1.5-1:2.3 |

Further, a radio (d2:d4) of the diameter (d2) to the tire width (d4) of the solid tire (20) is between 1:4.5 and 1:9, and a ratio (d1:d3) of the extension length (d1) to the tire height (d3) of the solid tire is between 1:1.5 and 1:2.6.

Through the foregoing ratios and position limitation, it can be ensured that by engaging the fastening members (40) with the bicycle rim (20), the extension sections (42) are maintained at the central position of the main body (31) in the axial direction (x) and free ends of the extension sections (42) are located adjacent to the central position of the main body (31) in the radial direction (y).

In this way, when the solid tire (30) runs over an obstacle to be deformed, the extension sections (42) of the fastening members (40) can prevent detachment of the tire caused by excessive turning or twisting of the tire, so as to maintain the stability of connection between the solid tire (30) and the bicycle rim (20) during driving and ensure the safety in driving.

Finally, the base sections (41) serve to provide a detailed construction convenient for a user to install. More specifically, each of the base sections (41) has a plate-shaped plate body (411) with a suitable thickness. A flat surface (412) is located on one side of the plate body (411) for the extension section (42) to vertically extend outwards therefrom. A pair of inclined surfaces (413) is respectively disposed at both ends of the long axis on another side of the plate body (411) opposite to the flat surface (412). By means of the inclined surfaces (413), the base sections (41) can be easily pushed into the annular groove (22) to be engaged with the flanges (23), facilitating the user to perform the installation.

REFERENCE NUMBERS

(10) connection stabilizing mechanism between solid tire and bicycle rim, (20) bicycle rim, (21) rim body, (22) annular groove, (23) flange, (30) solid tire, (31) main body, (32) tire lip, (33) recess, (34) socket, (40) fastening member, (41) base section, (411) plate body, (412) flat surface, (413) inclined surface, (42) extension section, (x) axial direction, (y) radial direction, (d1) extension length, (d2) diameter, (d3) tire height, (d4) tire width

What is claimed is:

1. A connection stabilizing mechanism between a solid tire and a bicycle rim, comprising:
   a bicycle rim having an annular rim body, an annular groove formed on an outer circumference of the rim body, two annular flanges protruding from two opposite sides of an opening of the annular groove respectively;
   a solid tire having an annular main body annularly disposed around the outer circumference of the rim body, an annular tire lip protruding from an inner circumference of the main body and inserted into the annular groove; and
   multiple fastening members each having a plate-shaped base section located in the annular groove with both ends of a long axis thereof engaged with the flanges, an extension section extending outwards from the central position of the base section in the long axis direction, inserted into the main body and located at the central position of the main body in an axial direction, wherein a ratio of an extension length of the extension section to a tire height of the solid tire is between 1:1.5 and 1:2.6, and a free end of the extension section is located adjacent to the central position of the main body in a radial direction.

2. The connection stabilizing mechanism between a solid tire and a bicycle rim of claim 1, wherein the extension section of each of the fastening members is column-shaped, and a ratio of the column diameter to the extension length is between 1:2 and 1:4.

3. The connection stabilizing mechanism between a solid tire and a bicycle rim of claim 2, wherein a ratio of the diameter of the extension section of the fastening member to the extension length is 1:3.

4. The connection stabilizing mechanism between a solid tire and a bicycle rim of claim 1, wherein the extension section of the fastening member is column-shaped, and a ratio of the column diameter to a tire width of the solid tire is between 1:4.5 and 1:9.

5. The connection stabilizing mechanism between a solid tire and a bicycle rim of claim 4, wherein a ratio of the diameter of the extension section of the fastening member to the tire width of the solid tire is 1:5.5.

6. The connection stabilizing mechanism between a solid tire and a bicycle rim of claim 4, wherein a ratio of the diameter of the extension section of the fastening member to the tire width of the solid tire is 1:6.

7. The connection stabilizing mechanism between a solid tire and a bicycle rim of claim 4, wherein a ratio of the diameter of the extension section of the fastening member to the tire width of the solid tire is 1:8.

8. The connection stabilizing mechanism between a solid tire and a bicycle rim of claim 1, wherein a ratio of the extension length of the extension section of the fastening member to the tire height of the solid tire is 1:1.9.

9. The connection stabilizing mechanism between a solid tire and a bicycle rim of claim 1, wherein a ratio of the extension length of the extension section of the fastening member to the tire height of the solid tire is 1:2.

10. The connection stabilizing mechanism between a solid tire and a bicycle rim of claim 1, wherein a ratio of the extension length of the extension section of the fastening member to the tire height of the solid tire is 1:2.3.

11. The connection stabilizing mechanism between a solid tire and a bicycle rim of claim 1, wherein each of the base sections has a plate-shaped plate body, a pair of inclined surfaces respectively disposed at both ends of a long axis on the same side of the plate body.

12. The connection stabilizing mechanism between a solid tire and a bicycle rim of claim 1, wherein each of the base sections has a plate-shaped plate body, a flat surface located on one side of the plate body and adhering to the solid tire.

13. The connection stabilizing mechanism between a solid tire and a bicycle rim of claim 12, wherein each of the extension sections vertically extends outwards from the planar surface.

\* \* \* \* \*